(12) United States Patent
Sassatelli et al.

(10) Patent No.: US 9,227,277 B2
(45) Date of Patent: Jan. 5, 2016

(54) METHOD FOR REPAIRING A TURBINE DIAPHRAGM AND DIAPHRAGM ASSEMBLY RESULTING THEREFROM

(75) Inventors: John Matthew Sassatelli, Valley Falls, NY (US); James Michael Kostrubanic, Burnt Hills, NY (US); Joseph Paul Turley, Charlotte, NC (US); Sheldon Dirk Westwood, Albany, NY (US)

(73) Assignee: General Electric Company, Schenectady, NY (US)

( * ) Notice: Subject to any disclaimer, the term of this patent is extended or adjusted under 35 U.S.C. 154(b) by 818 days.

(21) Appl. No.: 13/572,186

(22) Filed: Aug. 10, 2012

(65) Prior Publication Data

US 2014/0044536 A1 Feb. 13, 2014

(51) Int. Cl.
*B23P 6/00* (2006.01)
*F01D 5/00* (2006.01)
*F01D 9/04* (2006.01)

(52) U.S. Cl.
CPC .............. *B23P 6/005* (2013.01); *F01D 5/005* (2013.01); *F01D 9/041* (2013.01); *F01D 9/044* (2013.01); *F05D 2230/232* (2013.01); *F05D 2230/237* (2013.01); *Y10T 29/49238* (2015.01)

(58) Field of Classification Search
CPC ........ B23P 6/005; B23P 6/002; B23P 15/006; Y10T 29/49238; Y10T 29/49318; F01D 9/041; F01D 9/044; F01D 9/04; F01D 5/005; F05D 2230/237; F05D 2230/232; F05D 2240/121; F05D 2240/122
See application file for complete search history.

(56) References Cited

U.S. PATENT DOCUMENTS

| | | | |
|---|---|---|---|
| 4,326,833 A * | 4/1982 | Zelahy et al. | ............... 416/96 R |
| 5,697,151 A | 12/1997 | Werner et al. | |
| 6,394,750 B1 * | 5/2002 | Hiskes | .......................... 415/189 |
| 6,754,955 B1 | 6/2004 | Carl, Jr. et al. | |
| 2012/0047734 A1 * | 3/2012 | Miller et al. | ............. 29/888.021 |

* cited by examiner

*Primary Examiner* — Edward Look
*Assistant Examiner* — Danielle M Christensen
(74) *Attorney, Agent, or Firm* — Barclay Damon, LLP (57) ABSTRACT

This disclosure describes embodiments of a method of repairing a diaphragm found in a turbine, and a diaphragm assembly resulting from the same, that does not require welds in between the partitions. The method inserts a replacement part in place of certain machine-removed portions of the existing partitions on the diaphragm. The replacement part includes coupons that work in combination with the remaining portions of the partitions to form the aerodynamic shape of the original partitions.

20 Claims, 6 Drawing Sheets

METHOD FOR REPAIRING A TURBINE DIAPHRAGM AND DIAPHRAGM ASSEMBLY RESULTING THEREFROM

BACKGROUND OF THE INVENTION

The subject matter disclosed herein relates to the diaphragm of a turbine (e.g., gas and steam turbines) and, in particular, to repair of the aerodynamic partitions found in the flow path of the diaphragm.

Partitions in turbine diaphragms can incur damage during extended use. For example, in steam turbines, erosion and impact by foreign particulates on the partitions can damage critical components of the partitions including, for example, the trailing edge. Changes to the trailing edge modify the area through which steam and other exhaust gasses pass and can result in improper direction of steam flow relative to subsequent stages in the turbine. Overall, damage to the partitions can result in loss of turbine efficiency and unwanted vibrations.

During regularly scheduled outages of the turbine, teams can overhaul the steam turbine to refurbish the diaphragm. The overhaul includes inspection and repair of the partitions. The repair is meant to restore the partitions to re-establish proper steam flow and, thus, obtain better turbine efficiency. Achieving these goals often requires that the partitions are reshaped to effectively replicate the trailing edge before the onset of damage. However, because the partitions often have complex shapes, e.g., airfoils, significant effort is necessary to achieve the desired shape.

This effort includes, for example, taking steps to remove and/or to add material to the partition at the trailing edge. The steps may also include final contouring of the repaired partition, which works the new material back to the original aerodynamic shape of the partition. Typically, the repair techniques require operations (e.g., welding and machining) to occur in between the partitions, and, likely, in the flow path of steam (and other fluids). These locations are difficult to access. Moreover, because final contouring is important to performance of steam path, this step is conventionally done through manual operations that require precision tools and skilled technicians. Unfortunately, to properly address and repair the partitions using techniques that position welds in between the partitions involves a significant investment of money and time for highly skilled labor and, ultimately, can delay the turbine from coming back online in a timely manner.

The discussion above is merely provided for general background information and is not intended to be used as an aid in determining the scope of the claimed subject matter.

BRIEF DESCRIPTION OF THE INVENTION

This disclosure describes embodiments of a method of repairing a parts (e.g., diaphragm, nozzles, etc.) found in a turbine, and a diaphragm assembly resulting from the same, that does not require welds in the flow path. The method inserts a replacement part in place of certain machine-removed portions of the existing partitions on the diaphragm. The replacement part includes coupons that work in combination with the remaining portions of the partitions to form the aerodynamic shape of the original partitions. An advantage that implementation of embodiments of the proposed method is to reduce the time to repair the diaphragm, while also ensuring a more contiguous and accurate shape to the repaired partition.

The present disclosure describes, in one embodiment, a diaphragm assembly for use in a turbine. The diaphragm assembly comprises a diaphragm that has a steam path that comprises an inner sidewall, an outer sidewall, and a first partition and a second partition extending therebetween, wherein the first partition is spaced apart from the second partition to form a channel through which a fluid can flow. The diaphragm assembly also comprises a replacement part disposed in the steam path. The replacement part comprises a first coupon and a second coupon interposed between an inner band and an outer band, the first coupon and the second coupon aligning with, respectively, the first partition and the second partition. The diaphragm assembly further comprises a first weld and a second weld that secure the inner band to the inner sidewall and the outer band to the outer sidewall, wherein the first weld and the second weld are deposited outside of the channel.

The present disclosure also describes, in one embodiment, a diaphragm assembly for use in a turbine. The diaphragm assembly comprises: a diaphragm having a steam path that comprises an inner sidewall, an outer sidewall, and a first partition and a second partition extending therebetween, wherein the first partition spaced apart from the second partition to form a channel through which a fluid can flow. The diaphragm assembly also comprises a replacement part disposed in the steam path. The replacement part comprises a first coupon and a second coupon interposed between an inner band and an outer band, the first coupon and the second coupon aligning with, respectively, the first partition and the second partition. The diaphragm assembly further comprises one or more fasteners securing the inner band to the inner sidewall and the outer band to the outer sidewall, wherein the first weld and the second weld are deposited outside of the channel.

The present disclosure further describes, in one embodiment, a method for repairing a diaphragm for a turbine. The method comprises a step for forming a replacement area on the diaphragm. The replacement area comprises portions of a steam path on the diaphragm, the steam path comprising an inner sidewall, and outer sidewall, and a first partition and a second partition interposed therebetween to form a channel for a fluid to pass through the diaphragm. The method also comprises a step for positioning a replacement part in the replacement area. The replacement part comprises a first coupon and a second coupon interposed between an inner band and outer band, the first coupon and the second coupon comprising an aerodynamic shape that terminates in a leading edge. The method further comprises a step for forming a first weld and a second weld to secure the replacement part to the diaphragm, wherein the first weld and the second weld are deposited outside of the channel.

This brief description of the invention is intended only to provide a brief overview of the subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Broadly, this disclosure describes embodiments of a repair method, and parts used therein, to repair the steam path in diaphragms found in turbines (e.g., gas and steam turbines). In one embodiment, the repair method incorporates a replacement part into the structure of the diaphragm. Examples of the replacement part have features that replicate portions of the diaphragm that form the steam path. The repair method removes these portions, which often incur damage that is detrimental to performance of the turbine, to make room for the replacement part in the structure of the diaphragm. As set forth below, use of the replacement part restores the functional integrity of the steam path, without the need to perform extensive machining and/or other fabrication in an attempt to re-furbish the damaged portions on the diaphragm.

Figure 1:
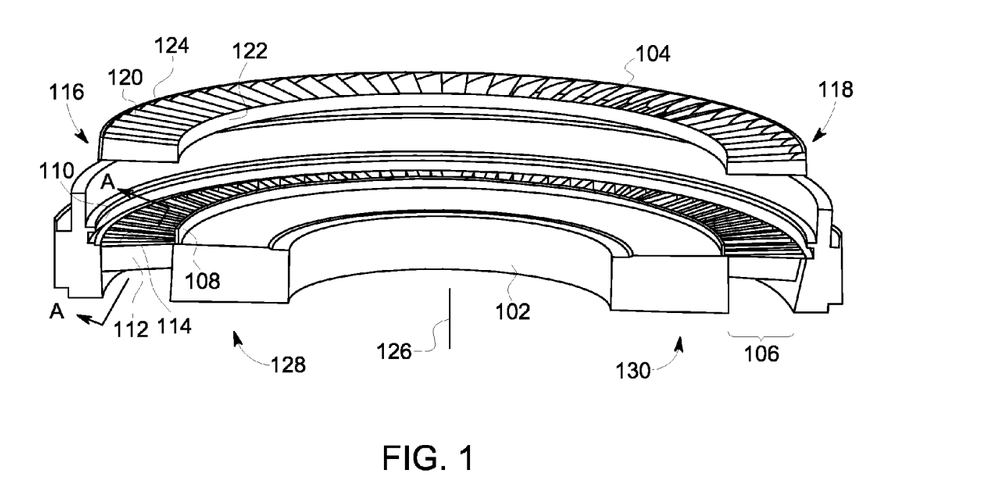
FIG. 1 depicts a perspective view of an exemplary embodiment of a diaphragm assembly in exploded form.
Figure 2:
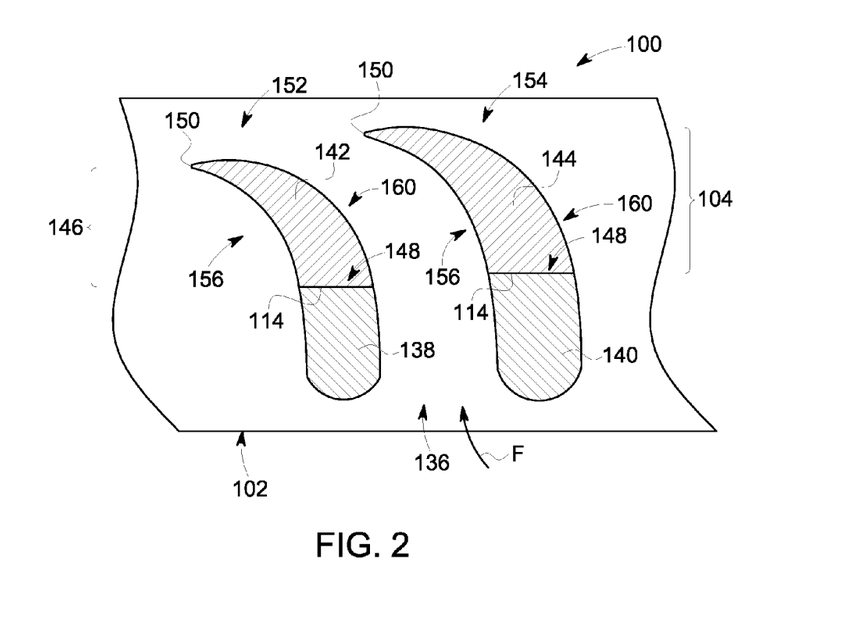
FIG. 2 depicts a detail, cross-section view of the exemplary diaphragm assembly of FIG. 1 in assembled form.
Figure 3:
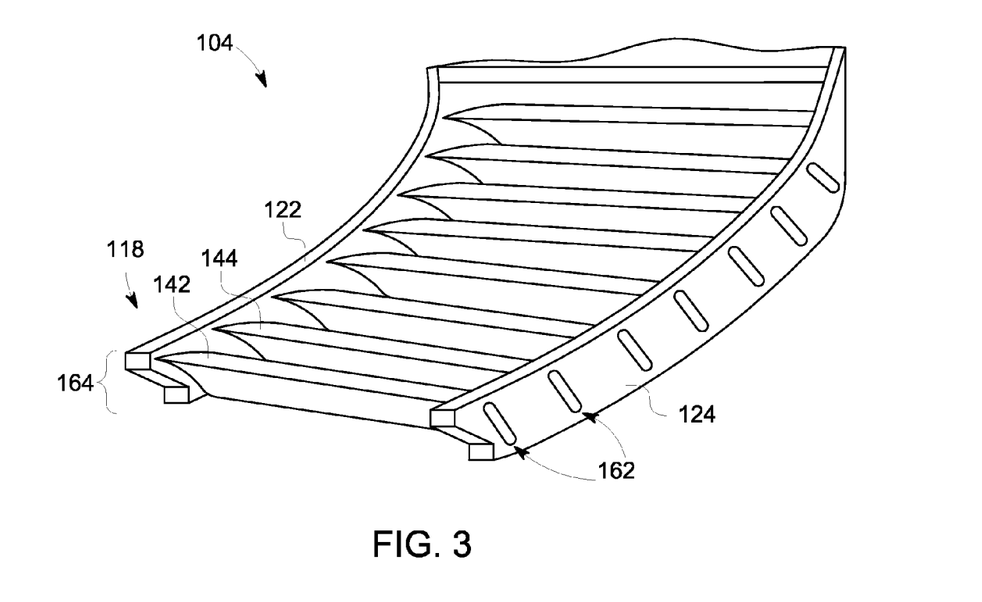
FIG. 3 depicts a detail view of an example of a replacement part found in the exemplary diaphragm assembly of FIG. 1.

FIGS. 1, 2, and 3 illustrate an exemplary embodiment of a diaphragm assembly 100, which can result from manufacture and/or execution of the proposed repair method. FIG. 1 depicts a perspective view of the diaphragm assembly 100 (also "assembly 100") in exploded form. The diaphragm assembly 100 has a diaphragm 102 and a replacement part 104. The diaphragm 102 includes a steam path 106 with an inner sidewall 108, an outer sidewall 110, and a plurality of partitions 112 that extend therebetween. The partitions 112 have a mating surface 114 to which the replacement part 104 mates when in position in the steam path 106. The replacement part 104 has a first replacement part end 116 and a second replacement part end 118 and includes a plurality of coupons 120 interposed between an inner band 122 and an outer band 124.

Examples of the diaphragm 102 and the replacement part 104 can extend for 180°, forming a half-circle or arc about a center axis 126. In one example, a pair of the diaphragms 102 secure together at a horizontal midline joint, generally found at a first diaphragm end 128 and a second diaphragm end 130. When in position in a turbine, two of the diaphragms 102 can adjoin and secure to one another at the respective first diaphragm end 128 and the second diaphragm end 130 to form an annular ring, also known as an annular stator stage in a turbine. This disclosure, however, also contemplates configurations of the diaphragm assembly 100 in which the angular dimension between the first replacement part end 116 to the second replacement part end 118 is less than 180°. For example, the diaphragm assembly 100 may comprise a plurality of annularly smaller replacement parts 104, each of which can have the same or different angular dimensions, e.g., 90° or less.

FIG. 2 illustrates a cross-section of a portion of the diaphragm assembly 100 in its assembled form, in which the replacement part 104 mates with the mating surface 114 of the diaphragm 102. This configuration forms a channel 136 to allow fluid F to flow, e.g., through the steam path 106 (FIG. 1). In the present example of FIG. 2, the diaphragm 102 has a first partition 138 and a second partition 140. The replacement part 104 has a first coupon 142 and a second coupon 144. The coupons 142, 144 have a contoured shape 146, e.g., an airfoil, which sweeps essentially upwardly from a bottom surface 148 to a trailing edge 150. The resulting combination of the partitions 138, 140 and the coupons 142, 144 form repaired partitions (e.g., a first repaired partition 152 and a second repaired partition 154). The repaired partitions 152, 154 have a pressure side surface 156 and a suction side surface 158 that bound the channel 136.

Construction of the replacement part 104 can ensure proper alignment of the partitions 138, 140 and the coupons 142, 144. This alignment is important to maintain continuity and ensure smooth transition of the pressure side surface 156 and the suction side surface 158 in the bifurcated part design, which requires alignment between the partitions 138, 140 and the coupons 142, 144 to avoid machining and/or material deposition at the interface of the mating surface 114 and the bottom surface 148 of, respectively, the partitions 138, 140 and the coupons 142, 144. In one example, the replacement part 104 can be constructed using data from coordinate mapping techniques that accurately identifies the position of the partitions 138, 140 relative to a datum, e.g., the center axis 126 (FIG. 1).

As best shown in FIG. 3, which is a detail of the second replacement part end 118, the replacement part 104 can also include one or more alignment structures 162, e.g., a slot, a notch, a detent, a pin, and/or other structure or combination of structures that sets the location of the coupons 142, 144, e.g., relative to the inner band 122 and the outer band 124. The replacement part 104 can also include one or more mating features 164 one the end of the inner band 122 and the outer band 124. The mating features have geometry and/or shapes that interface with corresponding geometry and/or shapes, e.g., on the first replacement part end 116 and the second replacement part end 118 when a pair of the replacement parts 104 are annularly positioned in a fully-assembled annular ring, e.g, that forms the annular stator stage in a turbine mentioned above.

Examples of the alignment structures 162 can be found on one or both of the inner band 122 and the outer band 124. The position of the alignment structures 162 may be based on coordinate measurements taken from the diaphragm (e.g., diaphragm 100 of FIG. 1) and, thus, help to correlate the position of the coupons 142, 144 with the position of the partitions 138, 140 on the diaphragm 104. Precision manufacturing techniques can properly shape and fit the replacement part 104 to the diaphragm 102, thereby further ensuring appropriate alignment of the partitions 138, 140 and the coupons 142, 144 to form the repaired partitions 152, 154.

Figure 4:
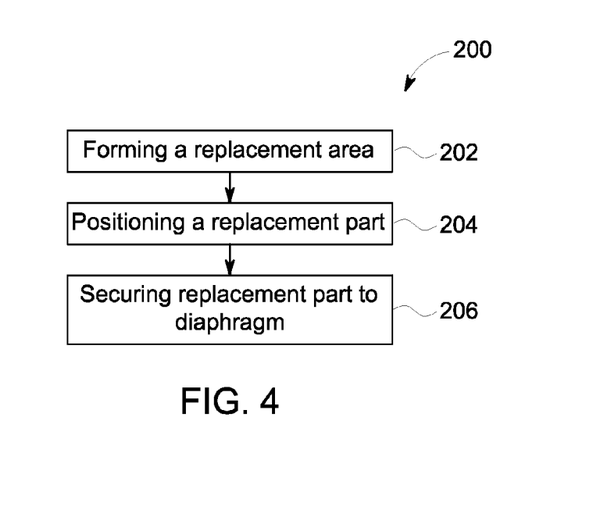
FIG. 4 depicts a flow diagram of a method for repairing a diaphragm, e.g., the diaphragm of FIG. 1.

Turning next to FIGS. 4, 5, 6, 7, 8, and 9 the discussion now focuses on steps and techniques for performing the repair to restore performance of a diaphragm. FIG. 4 depicts a flow diagram that shows steps of an exemplary embodiment of a repair method 200 that can incorporate a replacement part into a diaphragm. In one embodiment, the repair method 200 includes, at step 202, forming a replacement area on the diaphragm and, at step 204, positioning a replacement part in the replacement area. The method 200 also includes, at step 206, securing the replacement part to the diaphragm.

Figure 5:
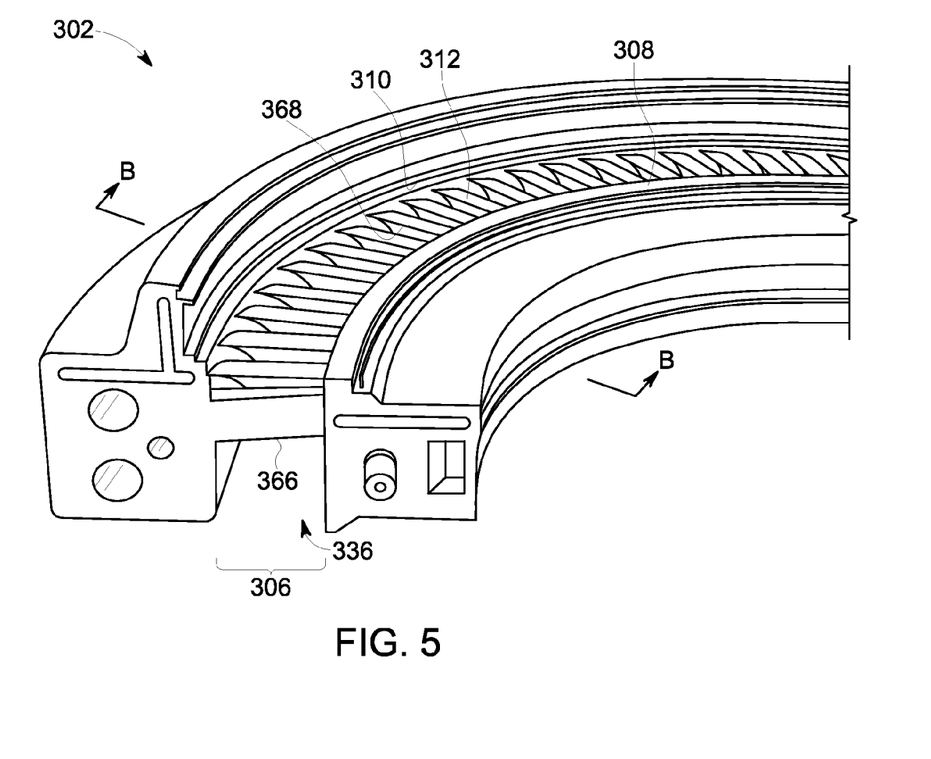
FIG. 5 depicts a perspective view of a diaphragm found in a turbine in its unrepaired state.

FIG. 5 depicts an example of a diaphragm 302 in its pre-repair state. As noted above, the diaphragm 302 must be removed from its position inside of a turbine or other operative equipment. The diaphragm 302 includes a steam path 306 with a plurality of partitions 312 having a leading edge 366 and a trailing edge 368. During operation of the turbine, fluids (e.g., air, steam, exhaust gases, etc.) can damage the partitions 312, e.g., by way of erosion, foreign particulate impact, corrosion and any one or more of a number of conditions that can cause, over time, a change in the geometry of the partitions 312. It is likely, for example, that damage will occur at the trailing edge 368 and areas proximate thereto (e.g., sidewalls 308, 310). Such damage can have an adverse effect on the performance of the turbine.

Figure 6:
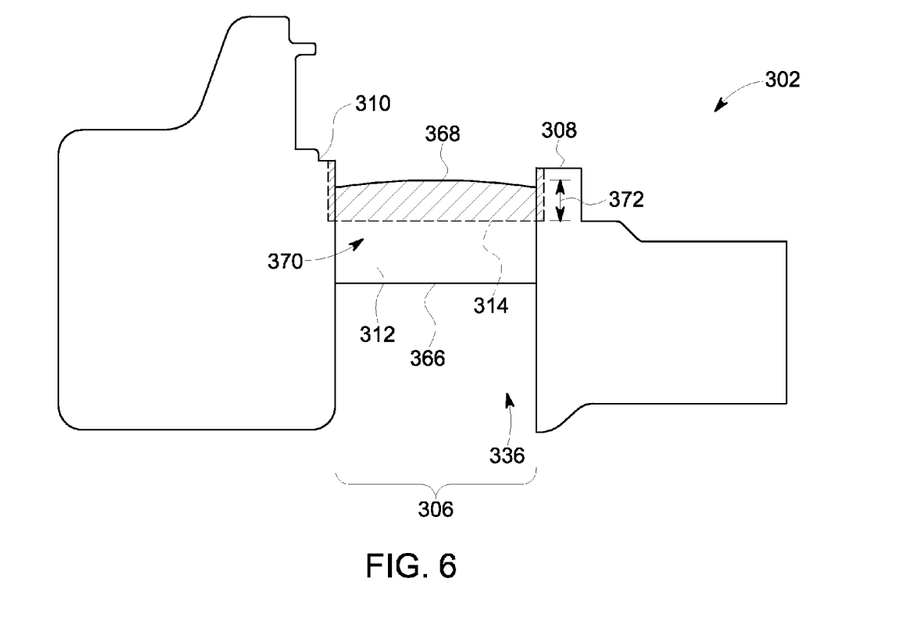
FIG. 6 depicts a side, cross-section view of a diaphragm, e.g., the diaphragm of FIG. 5.
Figure 7:
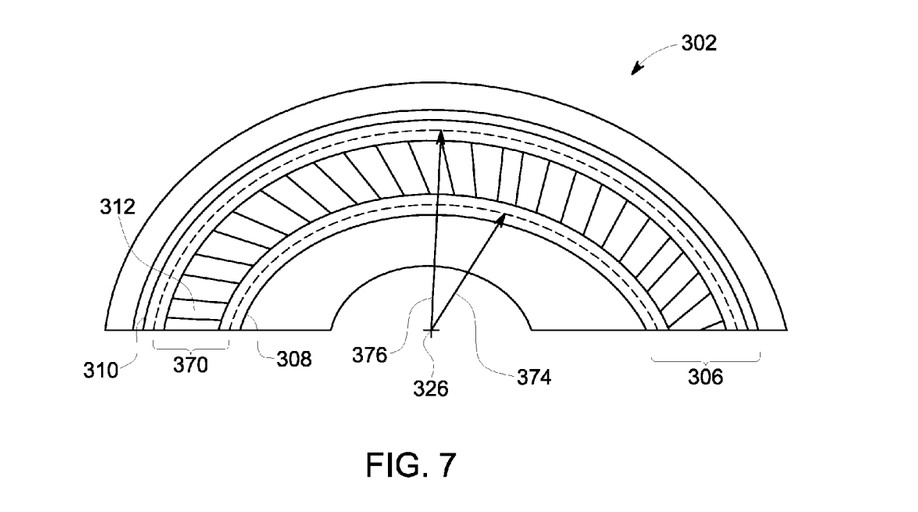
FIG. 7 depicts a top view of a diaphragm, e.g., the diaphragm of FIG. 5.

Forming the replacement area (e.g., at step 202) can include removing portions of the steam path 306 and, in one particular example, removing material of the partitions 312 to remove the damaged trailing edge 368. As shown in FIG. 6, which illustrates a cross-section view of the diaphragm 302 taken at line B-B, the diaphragm 302 has a replacement area 370, which identifies the material of the steam path 306 that will be removed during the repair method 200. The replacement area 370 is sized and shaped to receive a replacement part (e.g., replacement part 104, 204 of FIGS. 1 and 2). In one example, an axial dimension 372 (or "depth 372") defines the location of the mating surface 314 as measured, for example, from the leading edge 366 and/or from the setback face. As best shown in FIG. 7, which is a top view of the diaphragm 302, a first radial dimension 374 and a second radial dimension 376 define the radial width of the replacement area 370. These dimensions can be measured from the center axis 326 and/or other datum/reference as desired. The radial width of the replacement area 370, in one example, encroaches on both of the inner sidewall 308 and the outer sidewall 310, thereby requiring material to be removed from one both of these elements of the steam path 306.

During execution of the repair method 200, the diaphragm 302 undergoing repair can be set up on a milling machine, e.g., a horizontal and/or vertical milling machine. The diaphragm 302 can mount to a moveable table (e.g., a rotary table) with the trailing edge 368 in an upwardly facing orientation, e.g., for access by the milling head. Translation of the moveable table allows the milling head to cut away the damaged trailing edge 368 from one or more of the partitions 312. While in one example the replacement area 370 will extend 180°, i.e., the extent of the entire steam path 306, it may be desirable to machine away material from one or more smaller subsets, or radial sections, of the steam path 306. For example, damage may be concentrated to only a small number of the partitions 312. In this case, the replacement area 370 may encompass only the partitions 312 with damage, leaving the undamaged partitions largely intact.

Figure 8:
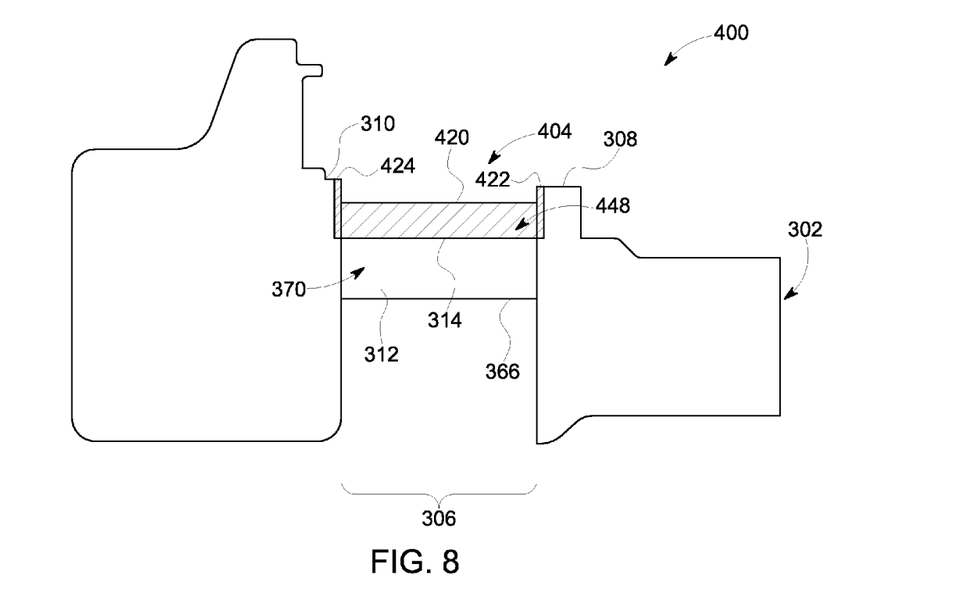
FIG. 8 depicts a side, cross-section view of another exemplary diaphragm assembly with the replacement part unsecured from the diaphragm.

With reference to FIG. 8, which illustrates a cross-section of an exemplary embodiment of a diaphragm assembly 400, the step of positioning the replacement part (e.g., at step 204) mates the bottom surface 448 of the replacement part 404 with the mating surface 314 on the modified diaphragm 302. To properly locate the coupons 420 with the partitions 412, the positioning step may also include one or more steps for clocking and/or indexing and/or aligning the replacement part 404 to the modified diaphragm 302. These steps may incorporate features (e.g., pins, slots, notches) in addition to alignment structures (e.g., alignment structures 162 of FIG. 3) on one or more both of the modified diaphragm 302 and the replacement part 404. Moreover, as discussed above, measuring techniques can be deployed that may include steps for creating a computer model or "point cloud" data set, which reflect measurement data taken from the modified diaphragm 302 to identify the position of the partitions 412. The resulting model can be utilized, for example, in steps for machining and/or forming the structure (e.g., the inner band 422 and the outer band 424) to conform with replacement area 370 on the modified diaphragm 302.

Securing the replacement part (e.g., at step 206) may incorporate welding and/or other fastening techniques (e.g., screws, bolts, etc.) to ensure the replacement part 404 does not move relative to the modified diaphragm 302 during implementation as the annular stator stage in a turbine. The welding can occur via manual weld process and/or using automated equipment. A feature of the proposed repair, for example, affords use of automated welding equipment because the welds are exposed and no welding is required in between partitions. Moreover, automating the welding process may, in one example, utilize the measurement data to guide and position the automated weld head to deposit the beads of weld, as desired. In one embodiment, the method 200 can further comprise brazing the replacement part to the diaphragm to form the first weld and the second weld. In one embodiment, the method 200 can further comprise utilizing an automated welding process to form the first weld and the second weld, wherein the first weld and the second weld comprise penetration welds.

Figure 9:
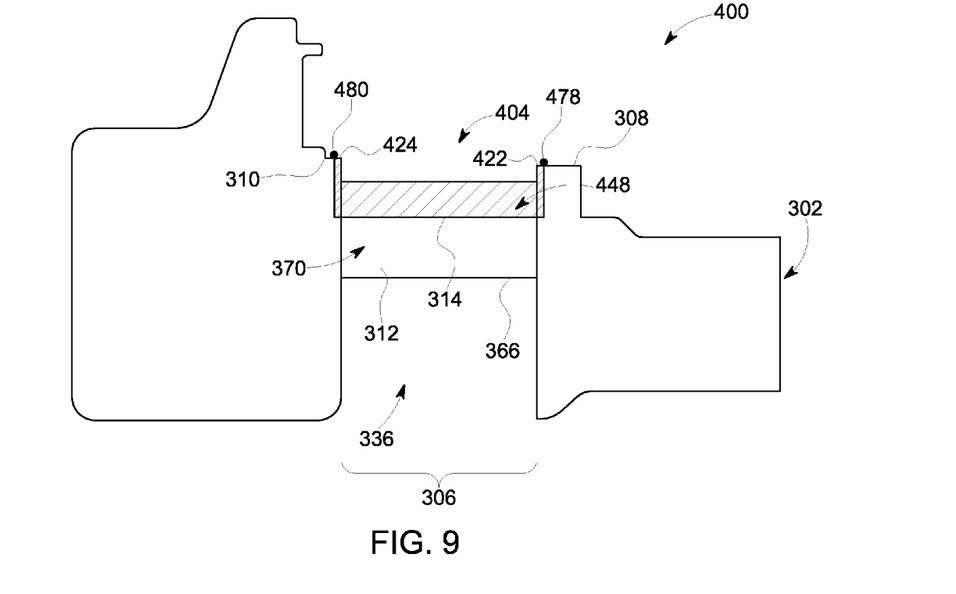
FIG. 9 depicts a side, cross-section view of the exemplary diaphragm assembly of FIG. 8 with the replacement part secured to the diaphragm using a first technique.

FIG. 9 illustrates the cross-section of the diaphragm assembly 400 in which welds (e.g., a first weld 478 and a second weld 480) secure the replacement part 404 to the modified diaphragm 302. In the example of FIG. 9, the first weld 478 and the second weld 480 are deposited on a top surface of, respectively, the inner sidewall 408 and the inner band 422 and the outer sidewall 410 and the outer band 424. This configuration secures the replacement part 404 into position in the replacement area 370, but does not require any weld material to be deposited into the areas of the channels 336. Although this disclosure contemplates a variety of welding techniques, in one example the first weld 478 and the second weld 480 are full penetration welds.

Figure 10:
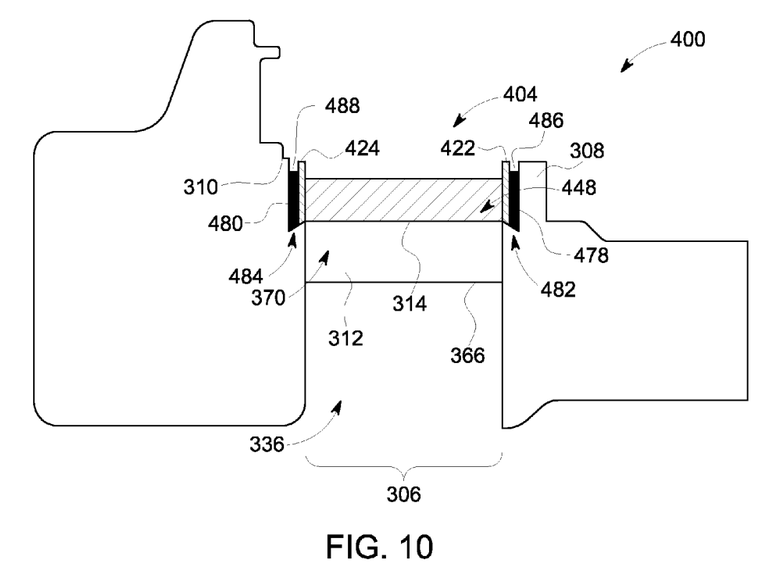
FIG. 10 depicts a side, cross-section view of the exemplary diaphragm assembly of FIG. 8 with the replacement part secured to the diaphragm using a second technique.

FIG. 10 illustrates the cross-section of the diaphragm assembly 400 that utilizes another configuration for the replacement area 370 and for the first weld 478 and the second weld 480. In the example of FIG. 10, the mating surface 314 includes a pair of outer angled portions (e.g., a first angled portion 482 and a second angled portion 484), where the mating surface 314 tapers, e.g., towards the leading edge 366. The outer angled portion 482, 484 provide the low boundary of gaps (e.g., a first gap 486 and a second gap 488) that separate the outer wall of the replacement area 370 from the inner band 424 and the outer band 426 of the replacement part 404. As shown in the FIG. 10, the welds 478, 480 fill the gaps 486, 488.

Figure 11:
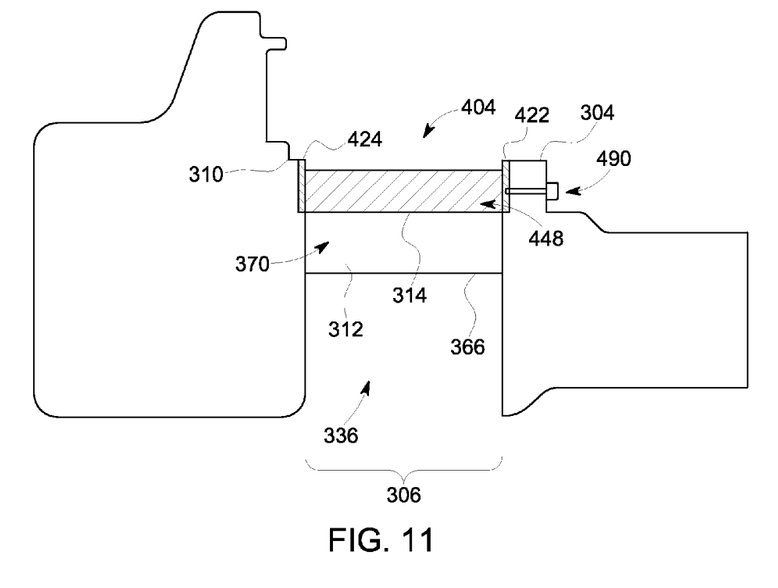
FIG. 11 depicts a side, cross-section view of the exemplary diaphragm assembly of FIG. 8 with the replacement part secured to the diaphragm using a third technique.

FIG. 11 illustrates the cross-section of the diaphragm assembly 400 that secures the replacement part 404 to the diaphragm 402 using one or more fasteners 490 (e.g., bolts, screws, pins, etc). The fasteners 490 can penetrate the inner sidewall 304 and the inner band 424. In other configurations, the fasteners 490 can also be found in the outer sidewall 310 and the outer band 424. Examples of this fastening technique can use fasteners 490 in lieu of welds (e.g., welds 478, 480 of FIGS. 9 and 10), to supplement the selected welding methodology, and/or in combination with welds to secure the replacement part 404 and the diaphragm 402 as contemplated herein.

In view of the foregoing, in a particular implementation of the methods and techniques discussed above, a diaphragm is placed on a vertical turning lathe and the partitions are cut back. The inner sidewall and the outer sidewall are also cut back an amount that allow for a first band and a second band on the replacement part with a thickness of from 1 mm to 8 mm. To construct the replacement part, flat strips of metal (e.g., 410 stainless steel) are manufactured to match the depth and height of the machined inner sidewall and outer sidewall.

In one example, the geometry (e.g., the arc) of the first band and the second band matches the geometry (e.g., the arc) of the inner sidewall and the outer sidewall on the diaphragm by, for example, rolling the material (a material forming technique known and recognized by artisans skilled in the manufacturing arts). The formed inner sidewall and the formed outer sidewall are set into place in the machined area (e.g., the replacement area) on the diaphragm. Coupons are placed in between the inner sidewall and the outer sidewall. The coupons are aligned with the existing machined partitions and secured in place to the inner band and the outer band, e.g., using tack welds and/or full penetration welds. The inner band and the outer band are then secured to the inner sidewall and the outer sidewall of the diaphragm, e.g., using brazing methods and/or full penetration welds and/or partial penetration welds.

In another example, the diaphragm is placed with leading edges of the partitions face up to allow precision measurements of each partition leading edge, e.g., using one or more manual measurement methods, laser scanners, coordinate measurement machines (CMM), FARO® Arm measurement machines, and the like. Data collected from these measurements identify the orientation and position of existing machined partitions. Using a three-dimensional model or like computer-aided rendering created with the precision measurements, information about the precise location of the partitions relative to the inner sidewall and the outer sidewall is available. The inner band and the outer band of the replacement part are made based on this information, wherein the inner band and the outer band may include pre-cut locations that identify locations for the placement of coupons. These locations will align the coupons with the existing machined partitions. After the inner band and the outer band of the replacement part are manufactured, the coupons are placed into (or proximate) the respective pre-cut locations on the inner band and the outer band and secured, e.g., by seal welds. The inner band and the outer band are then secured to the inner sidewall and the outer sidewall, e.g., by using brazing methods and/or full penetration welds.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A diaphragm assembly for use in a turbine, said diaphragm assembly comprising:
   a diaphragm having a steam path comprising an inner sidewall, an outer sidewall, and a first partition and a second partition extending therebetween, wherein the first partition spaced apart from the second partition to form a channel through which a fluid can flow;
   a replacement part disposed in the steam path, the replacement part comprising a first coupon and a second coupon interposed between an inner band and an outer band, the first coupon and the second coupon aligning with, respectively, the first partition and the second partition; and
   a first weld and a second weld securing the inner band to the inner sidewall and the outer band to the outer sidewall, wherein the first weld and the second weld are deposited outside of the channel.

2. The diaphragm assembly of claim 1, wherein the first coupon and the first partition and the second coupon and the second partition form a contoured shape.

3. The diaphragm assembly of claim 2, wherein the contoured shape comprises an airfoil.

4. The diaphragm assembly of claim 1, wherein the first weld and the second weld are disposed on a top surface of the inner band, a top surface of the outer band, a top surface of the inner sidewall, and a top surface of the outer sidewall.

5. The diaphragm assembly of claim 1, wherein the replacement part extends along the entire steam path.

6. The diaphragm assembly of claim 1, wherein the first partition and the second partition have a mating surface, and wherein a bottom surface of the first coupon and the second coupon mate with the mating surface.

7. The diaphragm assembly of claim 1, wherein the replacement part comprises alignment structures that locate the first coupon and the second coupon relative to the inner band and the outer band.

8. The diaphragm assembly of claim 1, wherein the diaphragm has a replacement area to receive the replacement part, and wherein the replacement area includes part of one of the inner sidewall and the outer sidewall of the steam path.

9. The diaphragm assembly of claim 8, wherein the replacement area includes part of both of the inner sidewall and the outer sidewall of the steam path.

10. The diaphragm assembly of claim 1, wherein the first coupon and the second coupon are welded to the inner band and the outer band.

11. A diaphragm assembly for use in a turbine, said diaphragm assembly comprising:

a diaphragm having a steam path comprising an inner sidewall, an outer sidewall, and a first partition and a second partition extending therebetween, wherein the first partition spaced apart from the second partition to form a channel through which a fluid can flow;

a replacement part disposed in the steam path, the replacement part comprising a first coupon and a second coupon interposed between an inner band and an outer band, the first coupon and the second coupon aligning with, respectively, the first partition and the second partition; and one or more fasteners securing the inner band to the inner sidewall and the outer band to the outer sidewall.

12. A method for repairing a diaphragm for a turbine, said method comprising:

forming a replacement area on the diaphragm, the replacement area comprising portions of a steam path on the diaphragm, the steam path comprising an inner sidewall, and outer sidewall, and a first partition and a second partition interposed therebetween to form a channel for a fluid to pass through the diaphragm;

positioning a replacement part in the replacement area, the replacement part comprising a first coupon and a second coupon interposed between an inner band and outer band, the first coupon and the second coupon comprising an aerodynamic shape that terminates in a leading edge; and forming a first weld and a second weld to secure the replacement part to the diaphragm, wherein the first weld and the second weld are deposited outside of the channel.

13. The method of claim 12, further comprising removing material from the first partition and the second partition to form a mating surface, wherein the first coupon and the second coupon have a bottom surface that mate with the mating surface.

14. The method of claim 13, wherein the replacement area incorporates portions of one or both of the inner sidewall and the outer sidewall.

15. The method of claim 12, further comprising forming the inner band and the outer band of the replacement part to conform with the replacement area.

16. The method of claim 15, further comprising aligning the first coupon and the second coupon with, respectively, the first partition and the second partition in the replacement area and welding the first coupon and the second coupon to the inner band and the outer band.

17. The method of claim 12, further comprising gathering measurement data that defines the position of the first partition and the second partition on the diaphragm and securing the first coupon and the second coupon on the replacement part based on positions of the first partition and the second partition determined from the measurement data.

18. The method of claim 17, further comprising creating a three-dimensional model of the first partition and the second partition with the measurement data, wherein positions for the first coupon and the second coupon on the inner band and the outer band are based on characteristics of the three-dimensional model.

19. The method of claim 15, further comprising inserting the first coupon and the second coupon into alignment structures on the inner band and the outer band, wherein the alignment structures identify locations of the first coupon and the second coupon on the replacement part that correspond to the measurement data.

20. The method of claim 11, wherein the first weld and the second weld deposit material on a top surface of the inner band, a top surface of the outer band, a top surface of the inner sidewall, and a top surface of the outer sidewall.

* * * * *